United States Patent

[11] 3,588,353

[72] Inventor Thomas B. Martin
Delran, N.J.
[21] Appl. No. 708,389
[22] Filed Feb. 26, 1968
[45] Patented June 28, 1971
[73] Assignee RCA Corporation

[54] SPEECH SYNTHESIZER UTILIZING TIMEWISE TRUNCATION OF ADJACENT PHONEMES TO PROVIDE SMOOTH FORMANT TRANSITION
7 Claims, 8 Drawing Figs.

[52] U.S. Cl. .................................... 179/1
[51] Int. Cl. .................................... G10l 1/02
[50] Field of Search .................... 179/1 (AS); 340/152

[56] References Cited
UNITED STATES PATENTS
3,319,002  5/1967  DeClerk et al. ............... 179/1(AS)
3,344,233  9/1967  Tufts ........................... 179/1(AS)

Primary Examiner—William C. Cooper
Assistant Examiner—Jon Bradford Leaheey
Attorney—H. Christoffersen ABSTRACT: A method of and apparatus for synthesizing speech from phonemes are described. The smooth transition of one phoneme into the next is accomplished by a timewise truncation of the end of the leading phoneme and of the beginning of the following phoneme so that the formants are continuous over the junction. The apparatus described stores phonemes in either a digital or an analog manner to permit their retrieval, starting and stopping the retrieval so that the desired truncation is achieved. The invention herein described was made in the course of or under a contract or subcontract thereunder with the Department of the Air Force.

PATENTED JUN 28 1971

INVENTOR
Thomas B. Martin

BY  H. Christoffersen

ATTORNEY

SPEECH SYNTHESIZER UTILIZING TIMEWISE TRUNCATION OF ADJACENT PHONEMES TO PROVIDE SMOOTH FORMANT TRANSITION

CROSS-REFERENCES TO RELATED APPLICATIONS

A Pat. application, Ser. No. 708,323, titled "Speech Synthesizer", filed by Joseph F. Schanne concurrently with this application, and assigned to the same assignee as the present application, contains related subject matter. FIGS. 1 through 6 are the same in both applications.

BACKGROUND OF THE INVENTION

Speech is a series of complex sounds generated and controlled by the larynx, tongue, oral and nasal cavities, and force of the breath. The abilities of persons to speak and to understand one another are acquired characteristics that tend to mask the implicit complications involved. The synthesis of speech by means other than human must take into account all the factors, however insignificant, that comprise understandable spoken words.

The recording of speech, as well as music, is usually done in an analog fashion. That is, the continuous changes in amplitude and frequency are maintained upon the storage medium. The reproduction of speech can be effected by reconverting the recorded signals into audible sound.

In the synthesis of speech, more than mere reproduction is desired. The objective of synthesized speech is the conversion of abstract facts or stored concepts into understandable speech to communicate the said facts or concepts to persons who want to know what they are.

There are many methods of accomplishing this desired result. The most obvious is to record all the sentences possible within the framework of all the facts that the user might desire or require. For even a small number of facts, however, the storage requirements for all permutations and combinations of the facts involved become prohibitive.

An approach to reducing the required amount of storage is to store phrases instead of sentences. The storage required is still very large for only a few facts. A further reduction is possible by storing words and combining them, under suitable control, into sentences. This has been done but results in a limited vocabulary. The same problems are encountered using syllables.

The most successful approach compatible with a large vocabulary without a prohibitively large storage requirement has been to use the basic speech unit, the phoneme.

A phoneme is a group of like or related sounds, varying under different phonetic conditions. Forty phonemes are involved in speaking English and they can be categorized into seven groups.

The first three groups comprise the vowel sounds. The first group consists of the 10 simple vowels; the second, the six complex vowels; and the third, the four semivowels and liquids.

The fourth group is the six plosives, or explosive sounds.

The fifth consists of the three nasal consonants.

The sixth group is comprised of nine fricatives or spirants, characterized by frictional rustling of the breath against some part of the oral passage as it is emitted.

The seventh group consists of two affricatives. These are a stop or explosive sound followed by a slow separation of the articulating organs, so that the last part if a fricative, or spirant, with corresponding organic position.

Table I (below) lists the phonemes by group as described above. Each of the phonemes is illustrated in a simple comprehensive word indicating by the usual pronunciation the sound of the phoneme, which is underlined for identification.

It is not enough, however, merely to reproduce a sequence of recorded phonemes to produce artificial or synthesized speech. Three conditions must be met in the production of natural sounding synthetic speech from phonemes, viz.:

1. there must be a continuity in the speech waveform at the junction of and,
2. there must be a continuity of the pitch periods across the phoneme boundaries; and
3. there must be a continuity of the constituent frequency components between phonemes.

TABLE I

Elementary Sounds (Phonemes) of the English Language

I. Simple Vowels:
 (1) fit
 (2) feet
 (3) let
 (4) bat
 (5) but
 (6) not
 (7) law
 (8) book
 (9) boot
 (10) bird II. Complex Vowels:
 (1) pain
 (2) go
 (3) house
 (4) ice
 (5) boy
 (6) few III. Semivowels and Liquids:
 (1) you
 (2) we
 (3) late
 (4) rate IV. Plosives:
 (1) bad
 (2) dive
 (3) give
 (4) pot
 (5) toy
 (6) cat V. Nasal Consonants:
 (1) may
 (2) now
 (3) sing VI. Fricatives:
 (1) zero
 (2) vision
 (3) very
 (4) that
 (5) hat
 (6) fat
 (7) thing
 (8) shed
 (9) sat VII. Affricatives:
 (1) church
 (2) judge The constituent frequencies of a phoneme can be considered as the dominant frequencies called formants. It is well known that any complex periodic waveform can be synthesized by a combination of sine waves of proper frequencies, amplitudes, and phase relations. The characteristic sound of a phoneme can be reproduced recognizably by the combination of no more than three formants, each of which may or may not vary with respect to time.

The synthesis of speech from phonemes requires, therefore, selecting the proper phoneme sequence and merging the formants of each at their junction points so that there are no discontinuities in the resulting speech.

Some of the approaches to providing smooth transition between phonemes have been described by Dudley et al. in U.S. Pat. No. 2,771,509; by David et al. in 2,860,187; and by Gerstman et al. in 3,158,685.

In this prior art, transitions between phonemes are provided by special circuits that provide the required continuities across the junction or that store several forms of each phoneme so that the proper one could be selected to provide the continuity at the junction.

An object of this invention is to provide artificial, or synthesized, speech of improved quality and requiring as little storage of sound as possible for an unrestricted vocabulary.

Another object of this invention is to produce synthetic speech in response to control signals that determine the information to be transmitted.

A further object of this invention is the transmission of speech by means of pulses to reduce the bandwidth requirements.

Another object of this invention is to provide means for converting the output data of electronic computers or other control devices into understandable speech.

BRIEF SUMMARY OF THE INVENTION

A speech synthesizer embodying the present invention provides for storing a number of phonemes, for extracting a sequence of the stored phonemes in a desired order, and for reproducing the extracted phonemes into audible sounds. The means for extracting the phonemes permits the extraction to start at a selected location different from the beginning and to terminate at a selected location different from the end of the stored phoneme. The starting and terminating locations are specified to provide proper continuity of speech with the preceding and following phonemes. Digital storage of phonemes is also provided for. Furthermore, provision is made for converting spoken phonemes into electrical signals to be stored. For digital storage of phonemes, a sampling and conversion circuit is provided.

DETAILED DESCRIPTION

Figure 1:
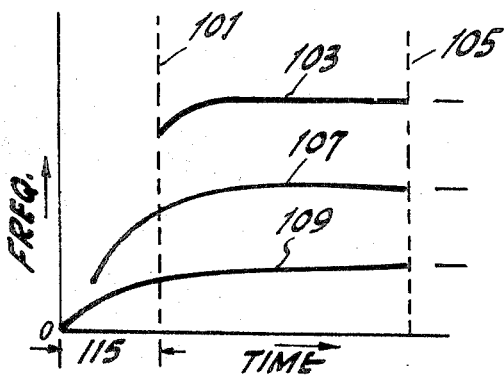
FIG. 1 represents the approximate variations of the formants in the spoken word "WED"

FIG. 1 shows the formants 103, 107, and 109 for the spoken word "WED" as they might appear on a spectrogram with solid lines depicting the midpoint of the bands of frequencies present. For instance, the lowest frequency formants 107, and 109 between the origin and the ordinate 101 constitute the /W/ phoneme which, in the word "WED," is shown to be made up of two frequencies, both of which increase with time during the time frame 115. The vowel sound of the /EH/ phoneme is composed of three formants 103, 107, and 109 between the ordinates represented by the dashed lines 101 and 105. The final consonant /D/ occurs after a short pause at the end of the vowel sound. For smooth, intelligible speech, the formants of each phoneme must be continuous with those of the following and preceding phonemes across their junctions. The ordinate 101 in FIG. 1 represents one such junction between the /W/ and /EH/ phonemes; the formants 107 and 109 blend smoothly together and are continuous across the junction 101.

Figure 2:
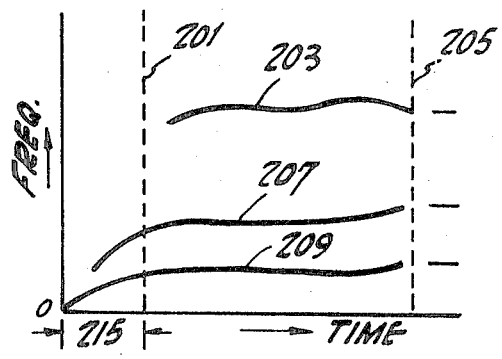
FIG. 2 represents the approximate variations of the formants of the spoken word "WADE"

FIG. 2 is a similar representation of the spectrogram of the spoken word "WADE." The /W/ phoneme consists of the lower two formants 207 and 209 in the time frame 215 which is delineated by the origin and the ordinate represented by the dashed line 201. The /AY/ phoneme consists of the three formants 203, 207 and 209 between the dashed lines 201 and 205. The formants of the /W/ and /AY/ phonemes blend smoothly at the junction therebetween represented by the ordinate 201.

Comparing FIGS. 1 and 2, the W phoneme in the word "WED" occupies a time frame 115 that is longer is duration than that 215 of the /W/ phoneme in the word "WADE." Also, in FIG. 1 the lowest two formants 107 and 109 of the phoneme /EH/ are lower respectively than the lowest two formants 207 and 209 of the phoneme /AY/ in FIG. 2. The /W/ phoneme formants in the word "WADE" in FIG. 2 are similar to the /W/ phoneme formants in the word "WED" in FIG. 1 over the same period of time, The outstanding difference between the two /W/ phonemes is that of FIG. 2 is truncated at an earlier point in time than the /W/ phoneme in FIG. 1.

Figure 3:
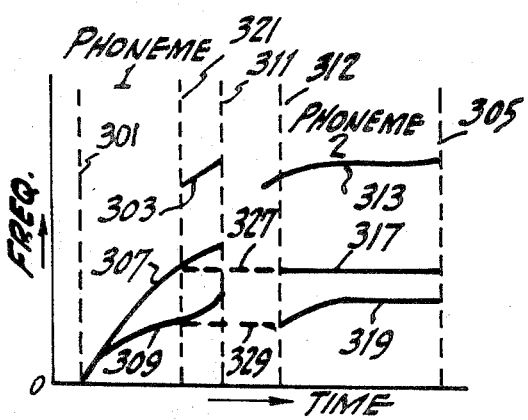
FIG. 3 illustrates how a junction to provide continuity of formants between phonemes is determined.

FIG. 3 shows two phonemes not joined, but rather separated by some time interval. The sound depicted in FIG. 3 —would be two complete phonemes spoken separately and distinctively.

If the two phonemes depicted in FIG. 3 are to be joined as part of speech synthesis, it is obvious that moving the terminating point in time 311 of the first phoneme into coincidence with the beginning point in time 312 of the second phoneme would result in discontinuities at the junction line so formed. The formants 303, 307 and 309 of the first phoneme would end abruptly and the formants 313, 317 and 319 of the second phoneme would immediately begin at different frequencies from those of the first. These abrupt changes in frequencies would result in distortions that would destroy the intelligibility of the speech being synthesized.

By extending lines 327 and 329 from the formant beginnings of the second phoneme, it can be noted in FIG. 3 that such lines will intersect the formants 307 and 309 respectively of the first phoneme. The point in time 321 determined by the intersection is a point at which the first phoneme can be truncated for a smooth transition of the formants from the first phoneme into those of the second phoneme. If the aforedescribed intersections do not occur at each formant of the first phoneme at the same time, the beginning of the second phoneme is changed so that they do. A slight amount of discontinuity is permissible so that the point in time at which the intersections occur need not be exactly the same.

Figure 4:
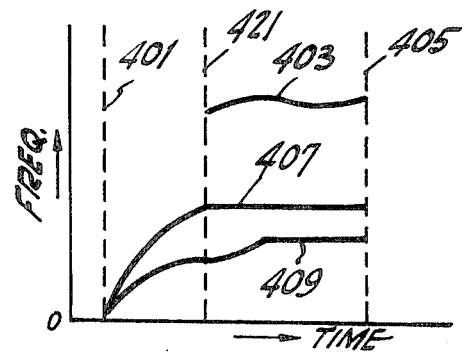
FIG. 4 shows the resultant formants of two phonemes from FIG. 3 joined as illustrated.

If the first phoneme in FIG. 3 is truncated at the point in time 321 depicted by the described intersection and this point in time is made to coincide with the beginning point in time 312 of the second phoneme, a junction is formed across which the formants are continuous. This is shown in FIG. 4 wherein the formants 407 and 409 are continuous across the junction 421, the combination phonemes starting at the same point in time 401 as that 301 of the first phoneme in FIG. 3 and the end of the combined phonemes occuring at a point in time 405 earlier than that 305 of the second phoneme in FIG. 3.

A continuous sequence of phonemes can be joined in pairwise sets in the manner described above to form speech. One method of producing such a sequence of phonemes is to record individual phonemes on magnetic tape, truncate the beginning and ending of each, and splice the segments of tape so obtained in a desired order. The result obtained by playing back the tape will be intelligible speech.

Another method of implementing this technique is to store individual phonemes in a manner that permits selected phonemes to be retrieved, truncated, and reproduced in a sequence previously determined, as, for example, by a control device such as a computer, to synthesize a desired speech pattern. In one embodiment of this invention, the phonemes are stored digitally by taking periodic samples of the amplitude of the waveshape of each phoneme and converting the magnitudes into binary numbers. The binary numbers obtained are stored in sequence for each phoneme.

Figure 5:
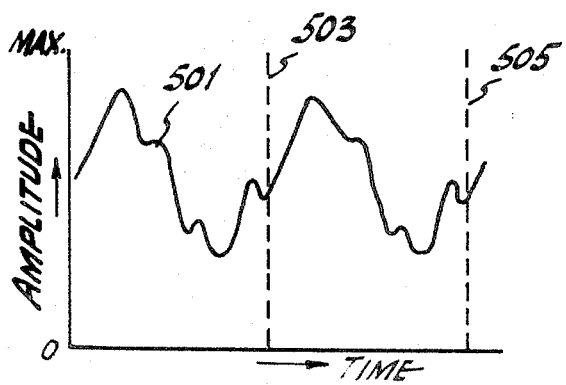
FIG. 5 represents two periods of a typical periodic complex waveform involved in speech.

FIG. 5 shows two periods of a typical waveform. The line 501 representing the amplitude of the wave as a function of time traces a complex path from the origin to the end of the first period 503. The line 501 then traces a similar path to the end of the second period 505. If the amplitude of such a wave is measured periodically occurring points in time that occur many times during the period of the wave being sampled, a series of numbers will result that will permit a close approximation of the original wave to be produced by generating individual amplitudes, as determined by the series, at intervals of time that are the same as those at which the measurements were taken. The more samples that are taken during a wave period, the more accurate the reproduction will be.

Figure 6:
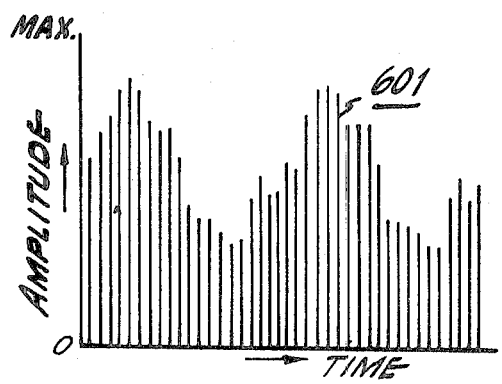
FIG. 6 shows the pulses resulting when the waveform of FIG. 5 is sampled at periodic intervals.

FIG. 6 is an example of a sample that could be taken of the waveform depicted in FIG. 5. Each of the amplitude plots 601 represents the instantaneous value of the continuously varying amplitude of the line 501 of FIG. 5 at a corresponding point in time.

Figure 7:
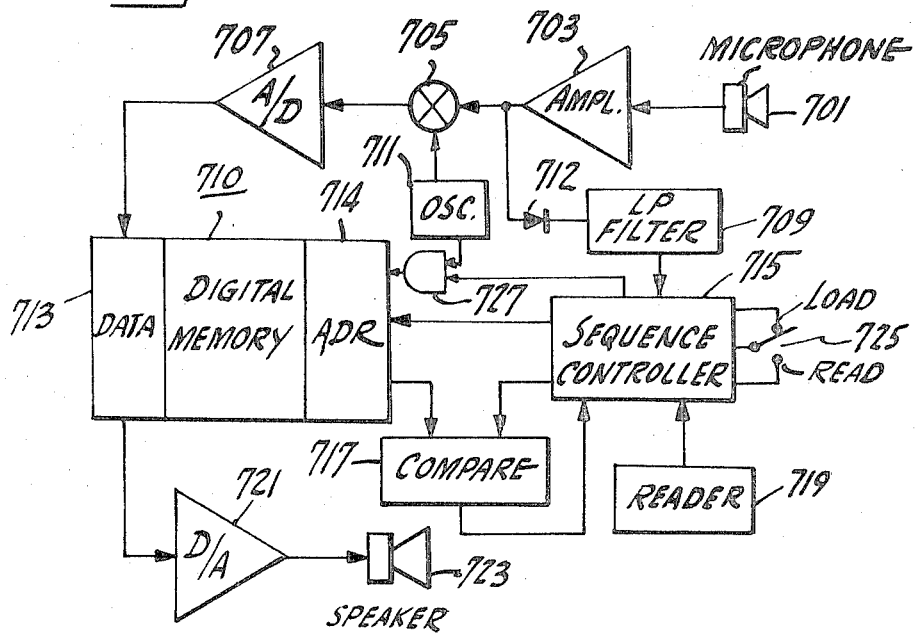
FIG. 7 is a block diagram of an embodiment of the present invention utilizing digital storage.

To demonstrate one method, by way of example, that such a technique may be employed, refer to FIG. 7. A phoneme is spoken into a suitable microphone 701 and amplified by means of an amplifier 703. The output of the amplifier 703 is applied to the input of a transmission gate 705 which is turned off and one by an oscillator 711. The output of the transmission gate 705 is a series of pulses with a time period that is the reciprocal of the frequency of the oscillator 711 and an amplitude which is the instantaneous value of the output of the amplifier 703.

FIG. 6 illustrates a train of pulse outputs that would emanate from the transmission gate 705 if the output of the amplifier were as depicted in FIG. 5.

In the present embodiment being described, the frequency of the oscillator 711 is chosen as 14 kHz. The period of the output pulses from the transmission gate 705 will be approximately 71½ microseconds. Each phoneme is assigned 4,096 memory locations. Therefore, 292.8 milliseconds is the maximum allowable phoneme length. Phonemes which are longer than the maximum are sustained, i.e., periodic, and can be repeatedly retrieved as required. Transient phonemes are all shorter than the above maximum.

The output of the amplifier 703 is rectified by a diode 712, smoothed to DC by a low-pass filter 709, and applied to a sequence control circuit 715. When switch 725 is in the LOAD position, the absence of a DC output from the low-pass filter causes the sequence controller 715 to transmit to the memory address register 714 of a digital memory 710, the starting address of the next phoneme. The starting address and terminating address is received from a reading device 719 which may be any device suitable to the purpose, e.g., paper tape reader, card reader, magnetic tape reader, etc. It may also be an electronic computer or other complex type of control device. The terminating address is stored in a register in the sequence controller 715.

The memory address register 714 consists of registers that are capable of being triggered to successive and consecutive addresses by the output of the oscillator 711 via a gate 727 which is enabled by a signal from the sequence controller 715 while a phoneme is being stored.

The output of the transmission gate 705 is converted to a binary number by an analog-to-digital converter 707. By way of example, the amplitudes of the pulses can be divided into 128 divisions. Each magnitude can then be represented by a binary number of seven bits from the zero value (0000000—) to the maximum value (1111111). The AC zero level of the output of the amplifier 703 is therefore 64 (1000000). (The AC zero level is actually taken as approximately 5 percent off center. The direction depends on the number of inversions through the amplifier. The reason for this offset is that the amplitude of the sound waves caused by the expulsion of breath is greater than that caused by the actions of the muscles in the larynx.)

The seven digit binary number from the A/D converter 707 is placed in the memory output register 713 to be stored in the memory by regeneration in response to a timing signal derived from the oscillator 711 via the enabling gate 727. When the phoneme has been stored in all the locations in the memory assigned to it as such a series of digitally coded signals, the storage of the phoneme in progress is considered completed. The termination is determined by a comparator 717 which upon detecting that the memory address 714 and the terminating address stored in the sequence controller 715 are equal, transmits an appropriate signal to the sequence controller 715.

When all of the phonemes required to reproduce speech have been stored in the memory, the switch 725 is moved to the READ position.

To synthesize speech, a suitable record medium is prepared and placed on the reader 719. The record medium contains two binary numbers for each phoneme desired, the first being the starting address and the second, the ending address of the phoneme in the memory. The starting and ending addresses are not necessarily the first and last storage addresses, respectively, of each stored phoneme. Two such addresses appear for each phoneme desired and the phonemes are arranged in a sequence that will produce the desired s—peech patterns.

The beginning and ending address are selected so that:
1. The value of the binary number stored in the memory is (1000000),
2. The formants in the phoneme are at frequencies which are contiguous with those in the end of preceding phoneme with regard to the starting address and with those of the beginning of the following phoneme with regard to the ending address.

The reader 719 could be an electronic computer and the addresses could be the result of computations made by the computer so that the resulting speech imparts information corresponding to the r—esults of the computer's operation.

In response to a command, the first two addresses are transmitted to the sequence c—ontroller 715 from the reader 719. The beginning address is transmitted to the memory address 714.

The phoneme at the address is retrieved and stored in the memory output register 713. Connected to the memory output is a digital-to-analog converter 721 that has an output voltage, the magnitude of which is determined by the value of the binary number at its input.

The memory address register 714 is increased by a count of one with each output pulse of the oscillator 711 via enabling gate 727. Therefore, successive binary numbers are retrieved from the memory 710 and are applied to the input side of the digital-to-analog converter 721. The amplitude of the output voltage of the converter 721 varies continuously with respect to the binary numbers appearing at its input, and is applied to a suitable transducer 723, such as a loudspeaker, so as t—o generate audible sounds.

The incrementing of the memory address register 714 continues until it equals the second address, i.e., the ending address, which has been stored in the sequence control 715. The equality if detected by the comparator 717 which transmits a control signal to the sequence controller 715.

Upon the receipt of the control signal signifying that the ending address has been reached, the sequence controller 715 immediately reads in two more addresses from the reader 719. The phoneme designated by the addresses is retrieved and converted to audible sound in the same manner just described.

Successive phonemes are processed until a signal to stop is received by the sequence controller 715 from the reader 719 or an external source.

Figure 8:
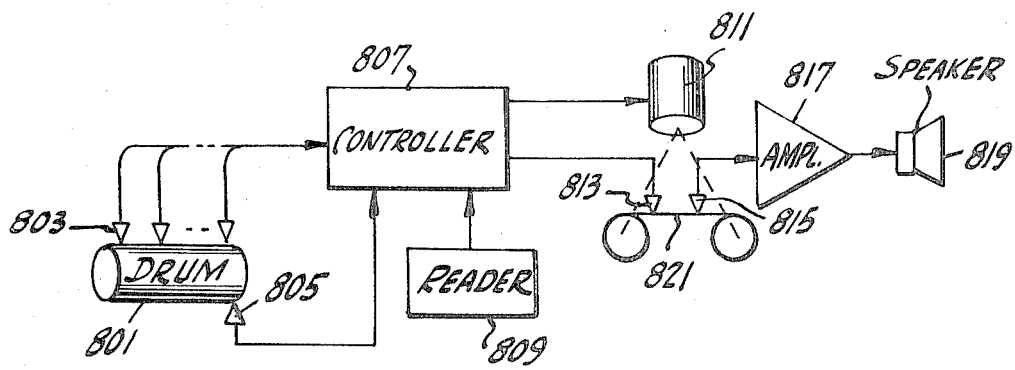
FIG. 8 is a block diagram of an embodiment of the present invention utilizing analog storage.

Another method of implementing this invention that does not require digital storage is shown, by way of example, in FIG. 8.

A drum 801 stores the phonemes in analog fashion, each on a separate band, and each band is furnished with a READ/WRITE head 803. A timing band is also provided and is read by means of a separate head 805.

A reader unit 809 supplies two addresses to the controller 807. The address are decoded therein so that the output of the proper head 803 is connected through a suitable amplifier in the controller 807 to a tape WRITE head 813 that is arranged to record the analog information on a magnetic tape 821.

By use of an index mark and counting pulses provided to the controller 807 via the timing track head 805, the proper starting position on the drum 801 of the selected phoneme is detected.

The determination of the starting point causes the controller 807 to actuate the motor 811 that controls the movement of the magnetic tape 821. The controller 807 permits the information to be sent to the tape WRITE head 813 so that the selected portion of the phoneme is recorded on the now-moving tape 821.

When the ending address is recognized by the controller 807 via the counts from the timing track head 805, the motor 811 is stopped, causing the tape 821 to stop. The signal from the selected drum head 803 is inhibited from reaching the tape WRITE head 813 on the tape.

The next two addresses are read from the reader 809 and the next phoneme is processed in a manner similar to that previously described.

When the last phoneme has been processed, a signal from the reader 809 or other external source causes the tape 821 to rewind at the beginning. The tape is then moved forward and the recorded speech signals are detected by a tape READ head 815, passed through an amplifier 817, and converted to audible sound by means of a suitable transducer 819, such as a loudspeaker or similar device.

Several refinements of this implementation can be easily accomplished. For example, the direction of rotation of the drum can be reversed and the phonemes retrieved in reverse order. This would preclude rewinding of the tape to accomplish playback. Furthermore, the speed at which the phonemes are retrieved from the drum and recorded on the tape can exceed the speed at which it is subsequently read.

I claim:

1. In a speech synthesizer which generates speech by a manifestation of a sequence of phonemes, the improvement comprising:

means for producing a smooth transition from a preceding phoneme into a following adjacent phoneme including means for truncating at least one of the signals representing the trailing portion of the preceding phoneme or the leading portion of the following phoneme whereby the significant frequency components at the junction of the two phonemes are equal or nearly equal.

2. Apparatus for synthesizing speech comprising:

storage means for storing a plurality of phonemes;

read out means for selectively retrieving phonemes sequentially from said storage means in a predetermined order;

control means for causing the read out means to eliminate the signals representing a trailing portion of a first phoneme of a pair of adjacent phonemes and a leading portion of a second phoneme of said pair whereby the significant frequency components of the pair are equal or nearly equal across the junction; and means coupled to the read out means for converting the retrieved, truncated phonemes to audio signals.

3. The invention as claimed in claim 2 wherein said storage means comprises means for digitally storing said phonemes.

4. The invention as claimed in claim 3 wherein the read out means comprises:

addressing means including a read address register means and a finish address register means responsive to said control means for indicating the addresses in said storage means from which the contents are to be retrieved;

incrementing means for causing the read address register means to indicate consecutive addresses; and comparator means responsive to the read address register means and to the finish address register means for providing a signal to indicate to said control means that the contents of the read address register means are equal to the finish address register means.

5. In a method for synthesizing speech by a manifestation of a sequence of phonemes, the improvement comprising the step of:

truncating adjoining portions of adjacent phonemes at positions that cause the significant frequency components of said adjacent phonemes to be equal or nearly equal at their junction.

6. In the synthesis of speech, a method for providing a smooth transition between two adjacent phonemes which occur in time sequence and the first of which naturally terminates in a group of significant frequency components which differ substantially from the group of significant frequency components at the start of the next phoneme comprising the step of terminating the first occurring phoneme and starting the second occurring phoneme at points in the respective waveforms of these phonemes at which the respective significant frequency components have similar values.

7. In the synthesis of speech, a method of providing a transition between one phoneme which naturally terminates in a group of significant frequency components which differ substantially in value from those at the beginning of a following phoneme but in which a region, at or close to the end of said natural termination, is defined by a first group of significant frequency components which have values roughly equal to those which are present in a region at or close to the beginning of the following phoneme, comprising the steps of:

eliminating that portion of the first phoneme, if any, following said region thereof at which said first group of significant frequency components is present; and eliminating that portion of the following phoneme, if any, between the beginning thereof and the region at which said group of significant frequency components having values roughly equal to those of the first group are present.